Nov. 2, 1965 F. B. SCHUYLER 3,215,295
CAR TOP CARRIER
Filed Jan. 27, 1964 6 Sheets-Sheet 2
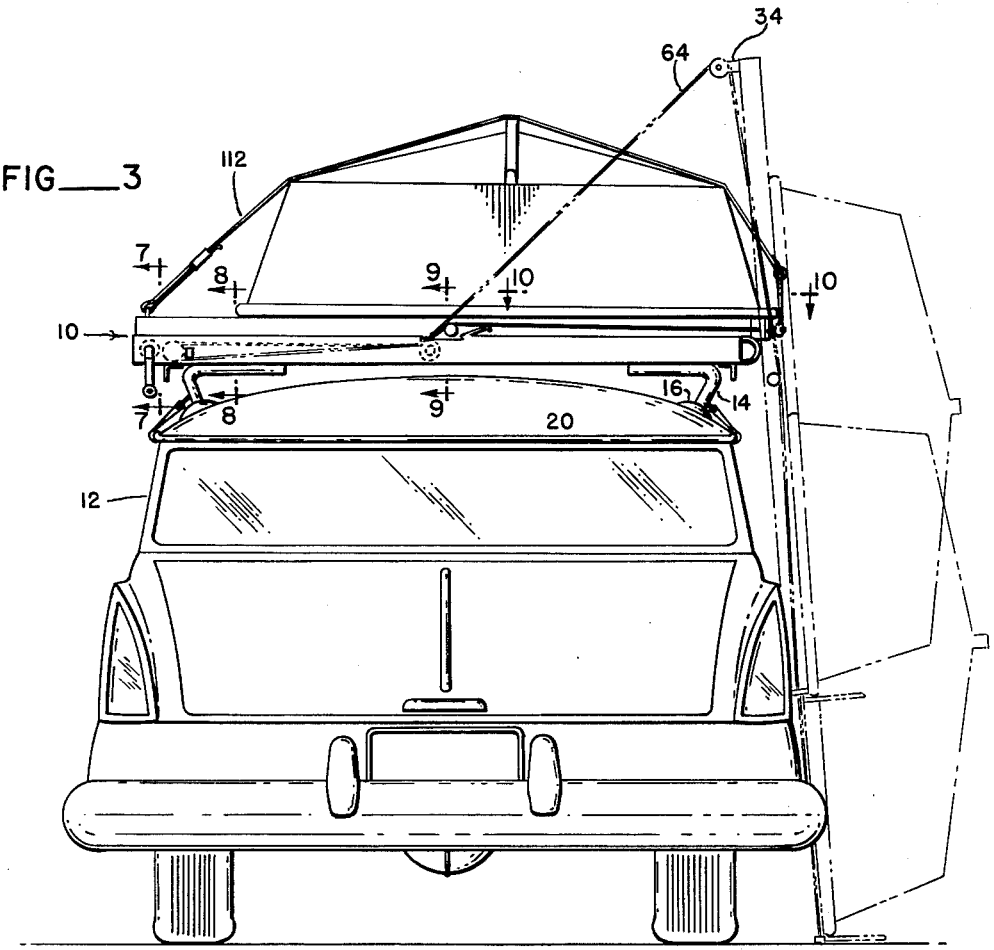
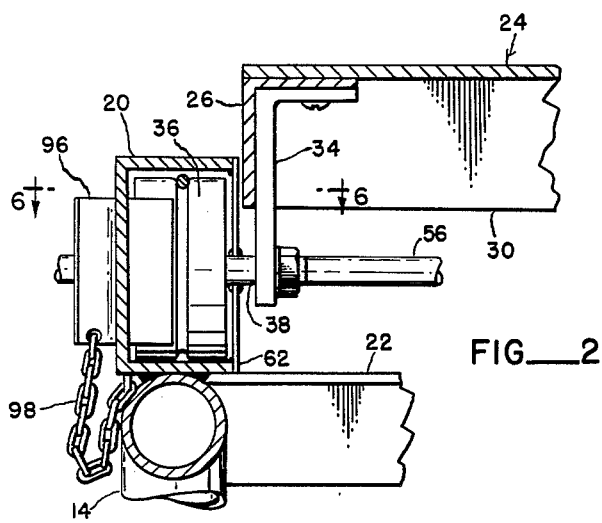
FRED B. SCHUYLER
*INVENTOR.*
BY Tuck & Cole

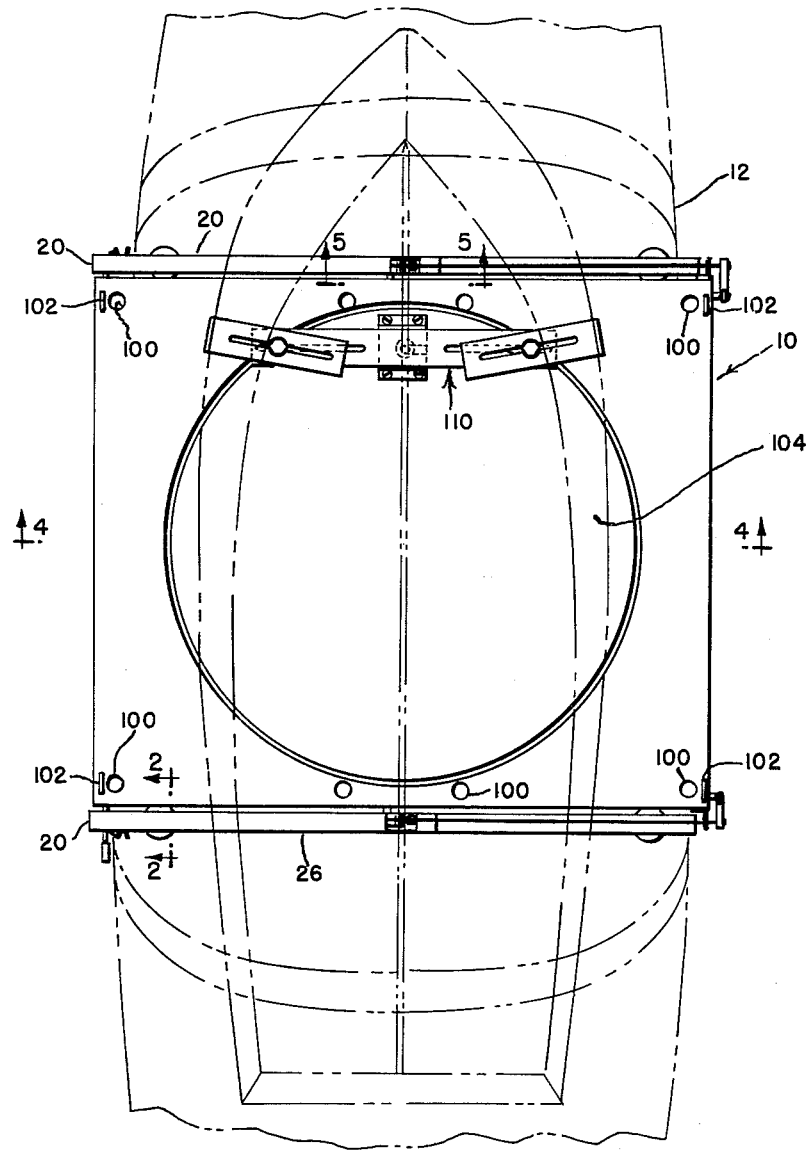
FIG__1

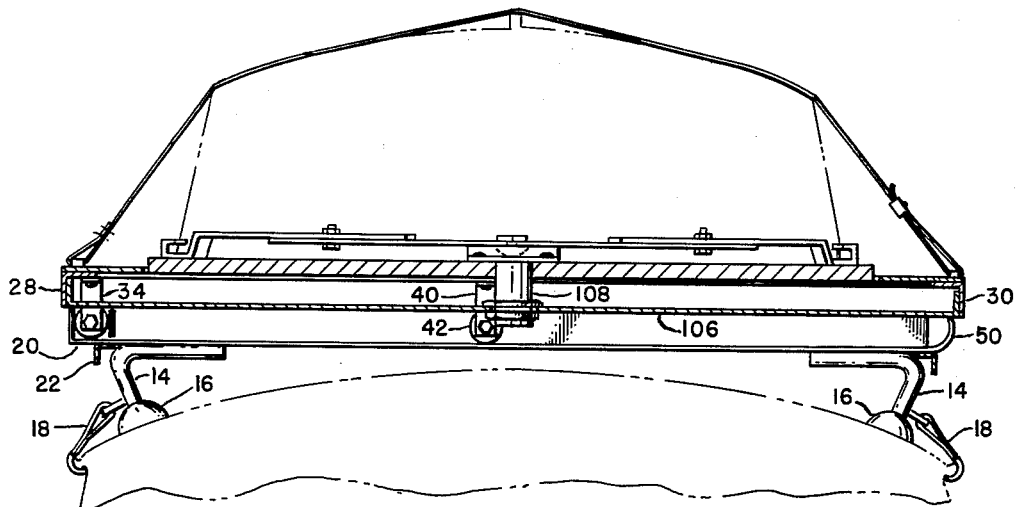
FIG.__4
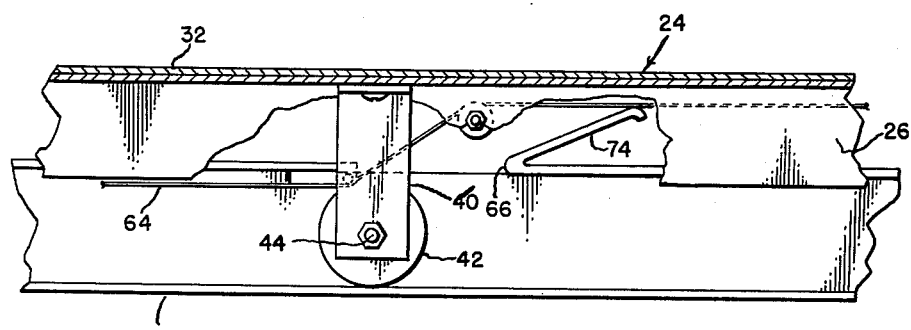
FIG.__5
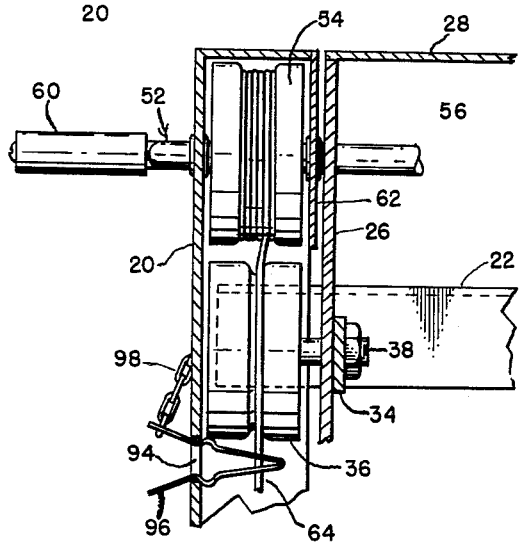
FIG.__6
FRED B. SCHUYLER
INVENTOR.
BY Tuck & Cole Nov. 2, 1965    F. B. SCHUYLER    3,215,295
CAR TOP CARRIER
Filed Jan. 27, 1964    6 Sheets-Sheet 4
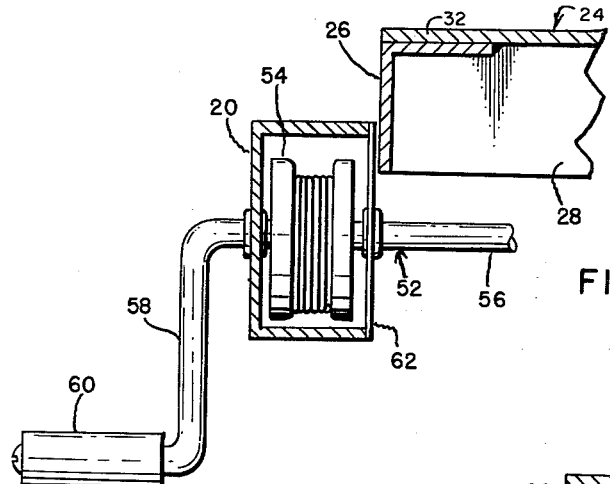
FIG__7
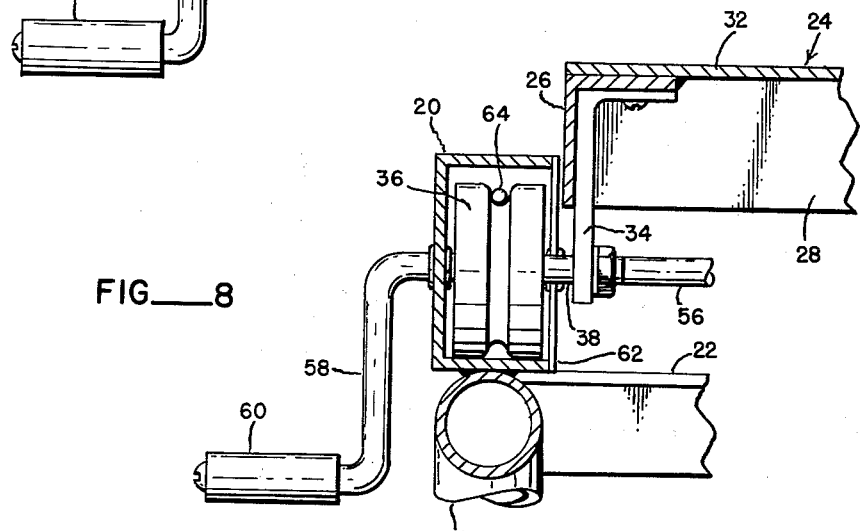
FIG__8
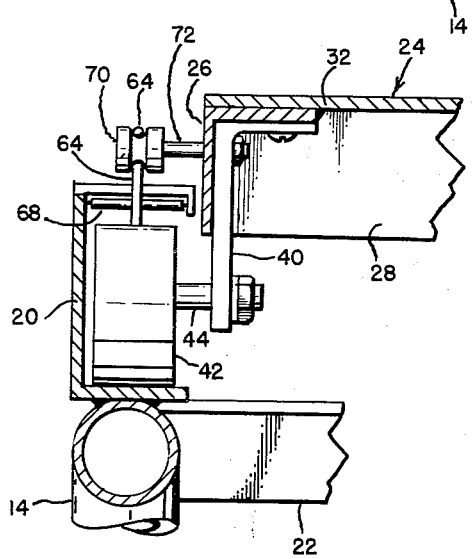
FIG__9
FRED B. SCHUYLER
INVENTOR.
BY  *Tuck & Cole*
ATTORNEYS Nov. 2, 1965   F. B. SCHUYLER   3,215,295
CAR TOP CARRIER
Filed Jan. 27, 1964   6 Sheets-Sheet 5
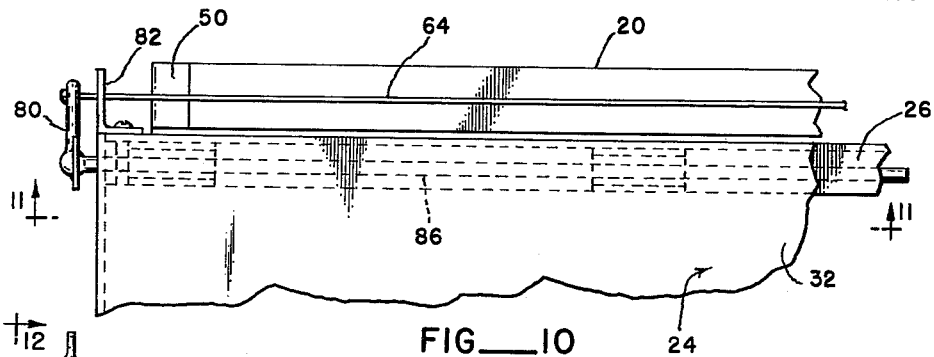
FIG__10
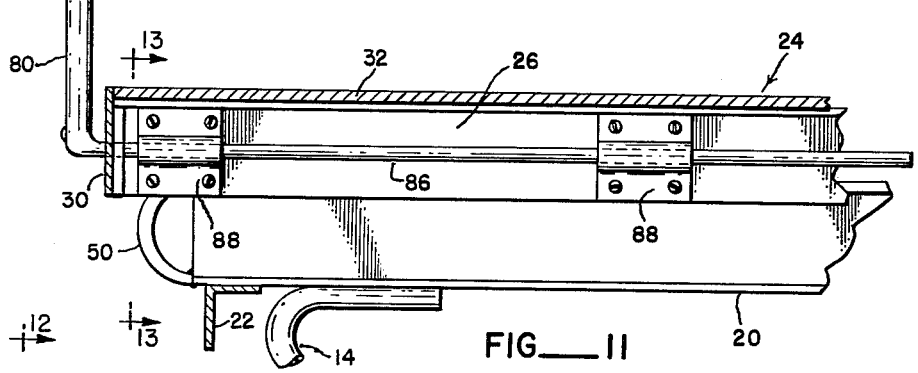
FIG__11
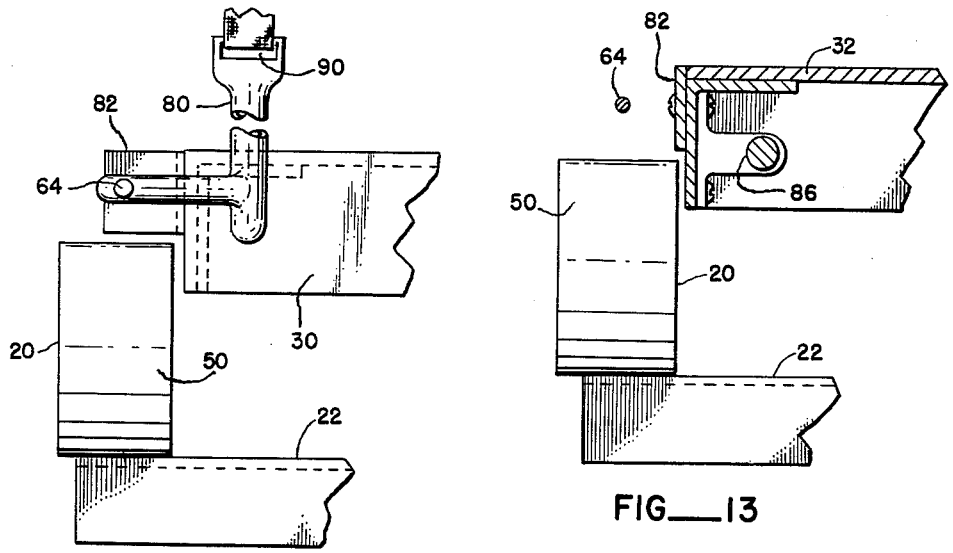
FIG__12   FIG__13
FRED B. SCHUYLER
INVENTOR.
BY Tuck & Cole
ATTORNEYS

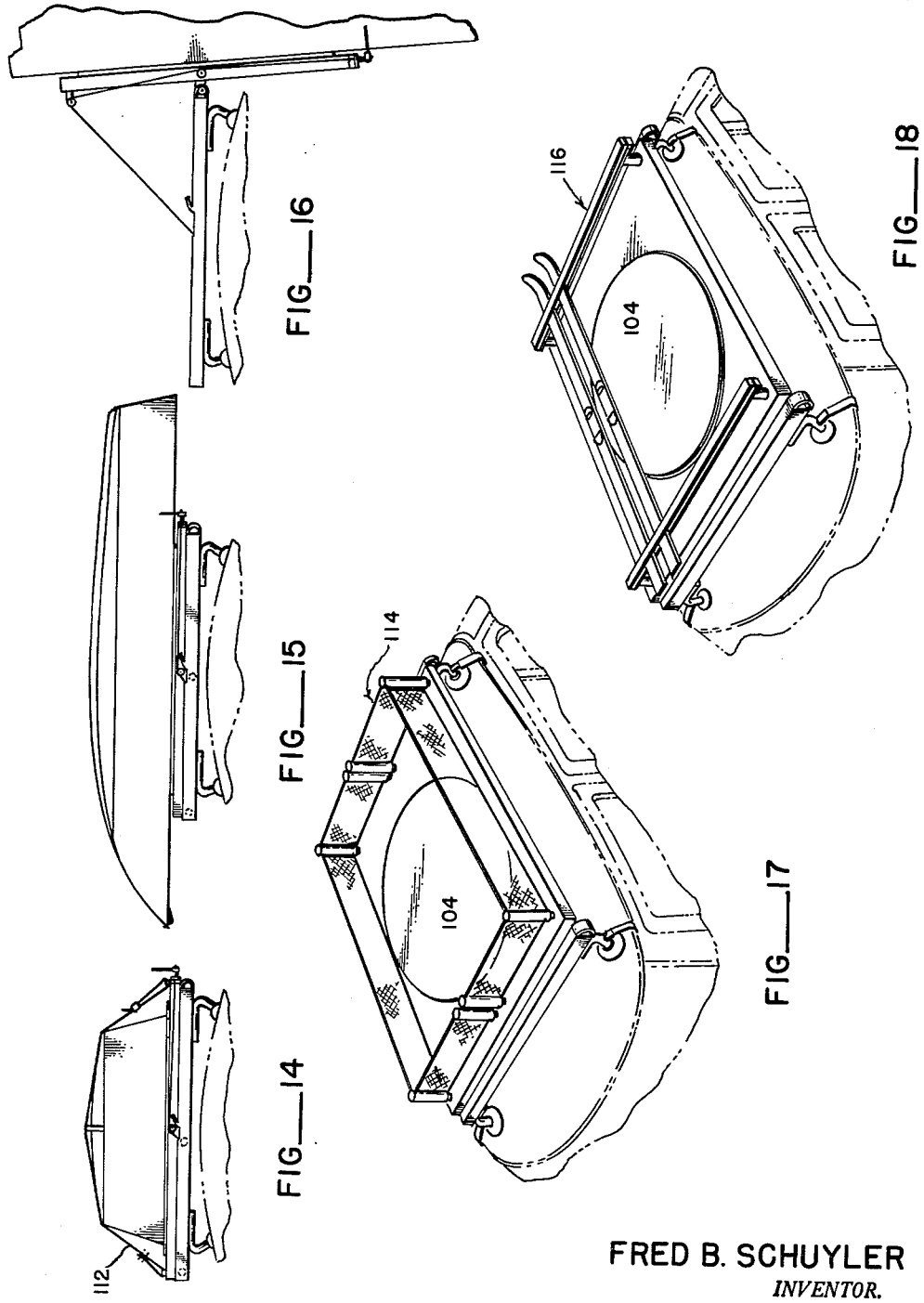

United States Patent Office 3,215,295
Patented Nov. 2, 1965

3,215,295
CAR TOP CARRIER
Fred B. Schuyler, Box 87, Staten Island, N.Y.
Filed Jan. 27, 1964, Ser. No. 340,134
6 Claims. (Cl. 214—450)

This invention relates to a new and improved car top carrier for detachable attachment to the roof of an automobile and more particularly to a car top carrier which has unique and novel movable platform means for easy and convenient packing and unpacking of the carrier.

One of the primary difficulties connected with hitherto known types of car top carriers is that of loading and unloading the carrier. Normally the owner must provide some means at the side of the car such as a box, stool or the like to permit him to stand above the ground so that he can thereby reach all locations on the carrier. Quite often it is necessary to move the step-up means from one side of the car to the other until the packing and unpacking job is completed. Such loading and unloading is particularly difficult when the objects to be put on the carrier are bulky or heavy or difficult to handle because of size. Other inherent disadvantages of conventional carriers are that they are not readily adaptable to the various kinds of loads which one may wish to carry. In other words the conventional carrier lacks convertibility features as from a side enclosed box-like affair to a rack for carrying skis. Similarly, conventional car racks are not susceptible of being converted to a simple flat carrier so that a small boat structure could be carried thereon.

The present invention seeks to overcome the limitations of conventional carriers by providing a platform which can be released and dropped to the side of the car for convenient loading of bulky objects. Furthermore, the platform in one embodiment of this invention has a turntable thereon for special adaptability to carry and particularly to load and unload bulky structures such as boats and other long frames or packages.

Accordingly it is an object of this invention to provide a car top carrier which is rugged, durable and spacious.

Another object of this invention is to supply a car top carrier which is simple in design, easy to construct and inexpensive to manufacture.

Yet another object of this invention is to furnish a carrier which is as easily demountable as any other known car top carrier.

Still another object of this invention is to provide a car top carrier which has a platform capable of being lowered over the side of the car to facilitate loading and unloading of the carrier.

A further object of this invention is to supply a car top carrier which can be provided with a turntable to expedite the handling of particularly awkward and bulky objects.

An even further object of this invention is to furnish a car top carrier which despite its design has a minimum of moving parts.

Still a further object of this invention is to provide a car top carrier which eliminates the need for a short step ladder or stool in order for the owner to properly pack the carrier.

Yet a further object of this invention is to supply a car top carrier which is easily convertible from a rail type rectangular enclosure to a type which will carry skis and other elongated objects or the like to a type carrier in which all superfluous structure may be removed leaving a perfectly flat platform on which especially long and bulky objects may be carried with great safety and security.

These and other objects and advantages will become subsequently apparent in the details and construction and operation, as more fully described and claimed hereinafter. Reference may be had to the accompanying drawings, wherein like numerals refer to like parts throughout, and in which:

FIGURE 1 is a top plan view of this invention as seen mounted on the roof of a vehicle;

FIGURE 2 is a cross-sectional view taken through the line 2—2 of FIGURE 1 showing portions of the main supporting structure and also of the platform structure;

FIGURE 3 is a rear view in elevation showing how this car top carrier looks from the back of the car and in which lines in phantom illustrate how the carrier platform may be lowered over the side of the car;

FIGURE 4 is a cross-sectional view, in elevation taken along the line 4—4 of FIGURE 1 and showing how a turntable feature is mounted or incorporated in the carrier platform;

FIGURE 5 is a partial cross-sectional view in elevation taken along the line 5—5 of FIGURE 1 which, in conjunction with other views, shows how the platform is mounted for movement on the main supporting frame;

FIGURE 6 is a partial cross-sectional view in plan taken along the lines 6—6 of FIGURE 2 and illustrating the reel and crank means by which the platform is lowered and raised into place;

FIGURE 7 is a partial view in cross-section and in elevation taken along the line 7—7 of FIGURE 3 and further illustrating the crank and reel mechanism shown in FIGURE 6;

FIGURE 8 is another partial cross-section view in elevation taken along the line 8—8 of FIGURE 3 and further illustrating the crank and reel mechanism shown in FIGURES 6 and 7;

FIGURE 9 is a partial cross-section view and in elevation taken along the line 9—9 of FIGURE 3 showing the roller mounting structure for the platform which is also shown in FIGURE 5;

FIGURE 10 is a partial plan view taken along the line 10—10 of FIGURE 3 further illustrating the side and corner structure of the supporting frame and the platform on the side which is capable of being lowered over the side of the vehicle;

FIGURE 11 is a partial view in cross-section and in elevation taken along the line 11—11 of FIGURE 10 and showing in greater detail the structure to which the lowering cables are attached;

FIGURE 12 is a partial elevational view taken along the line 12—12 of FIGURE 11 and further illustrating the details of the cable anchoring structure shown in FIGURE 11;

FIGURE 13 is a partial view in cross-section and in elevation taken along the line 13—13 of FIGURE 11 and further clarifying the details of the anchoring structure;

FIGURE 14 is a partial rear end view showing how a boat would be mounted on this car top carrier;

FIGURE 15 is a partial rear end view showing the same structure as in FIGURE 14 but with the boat turned on the turntable for lowering over the side of the car;

FIGURE 16 is a view taken from the same position as FIGURES 14 and 15 and showing the boat being lowered over the side of the car;

FIGURE 17 is a perspective view showing the car top carrier adapted with rails or fences around the periphery of the platform for receiving boxes, luggage and the like; and FIGURE 18 is another perspective view showing how the carrier may be adapted with ski racks or other similar holding means for carrying various types of elongated objects.

Referring now to the drawings, it will be seen that the carrier, generally referred to by the number 10, is mounted on the roof of an automobile 12. The carrier is generally square although it may also take a rectangular shape, and extends from side to side of the car and from a line across the rear of the roof to a line across the front part of the roof. The carrier has leg structures 14 in close proximity to the four corners thereof, which leg structures have the conventional rubberized feet 16 which prevent the automobile body surface from being marred. The straps 18 and hook structures thereon hold the legs 14 firmly and securely on the roof. The basic supporting frame structure mounted on legs 14 is composed of two transverse, channel-shaped stationary frame members 20. The rigid frame members 20 are of approximately equal length and can be seen to extend across the roof between opposed legs 14 and are securely fastened to the legs as by welding or the like. In order that the rigid frame members 20 be held securely upright and so that an essentially rigid frame structure is attained, the under sides of corresponding ends of members 20 are interconnected by longitudinal angle tie-frame members 22. Members 22 are slightly spaced inwardly from the end of the frame members 20, and as can be seen in FIGURES 3, 4 and 11, said angle members 22 are close to the leg structures 16. Thus a strong frame structure is mounted on and secured to the four legs.

As mentioned above, rigid frame members 20 are channel shaped and arranged so that the interior of said channels are directed inwardly to form the tracks on which the rollers of the platform are supported. The platform, generally designated by the number 24, is a rectangular or square frame composed of angle bars forming side frame members 26, driver or back side frame member 28 and drop side or front frame member 30. This rectangular or square frame of members 26, 28 and 30 is overlayed with a platform top 32 made of wood, metal, rigid plastic or other suitable decking material. Platform 24 generally occupies the space between the rigid supporting frame members 20 and, as will be seen and later understood, is slightly raised above said members 20. The platform side frame members 26 are generally close and parallel to channel members 20. The platform 24 is supported on rollers which engage the rigid structure members 20 as tracks. On its rear side the platform frame has an L-shaped downwardly extending supporting bracket 34 on each of the frame members 26. Said brackets 34, as can be seen in several of the views, extend below the lower edge of the platform frame. The brackets 34 function as mountings for the rear rollers 36 by virtue of axle structure 38. Note, particularly with reference to FIGURE 6, that the brackets 34 are spaced slightly inwardly from the back end on the underside of members 26 to allow space for a cranking structure which will be more fully described hereinafter. Thus, rear rollers 36 comprise a means by which the rear or driver's side of the movable platform is actually supported in the channel member 20.

At a distance approximately half way between the rear platform channel 28 and the front platform channel 30 are located on opposed aligned sides of the two side channels 26, forward supporting brackets 40. Brackets 40 are also generally L-shaped and support the forward rollers 42 on the short axle shafts 44. The rollers 36 and 42 turn freely on their shafts. It will be understood that the rear rollers 36 are at the rear side of the platform and that the forward rollers 42 are approximately centered on the platform that the rollers permit the platform to traverse a distance of about half its overall width along the channels 20.

The cranking mechanism obstructs the rear ends of channels 20. The front or drop side end of the channels is also blocked by the curved strap 50 which is welded at each end to the channel 20 so that it conforms roughly with the curvature to the radius of forward rollers 42. Thus the platform cannot, at any time, disassociate itself from the supporting frame.

At the extreme back end of each of channels 20 is a pulley mechanism and crank generally designated by the number 52. Said mechanism includes the pulley 54 which is rigidly secured to shaft 56. Shaft 56 extends entirely across the back side of the carrier from one channel 20 to the other. The pulleys 54 are rigidly secured on shaft 56 and are turned by crank 56 which has handle 60. Shaft 56 is journalled in the web portion of each of channels 20. To further strengthen the pulley structure a reinforcing plate 62 is secured as by welding across the rear inside end of channel 20 so that the shaft 56 is also journalled therein. Thus the shaft 56 is rotatably received in solid structure from each side of pulley 54. The crank mechanism is located at one side only, preferably on the side which faces the rear of the vehicle. A cable 64 is anchored to and wound around pulley 54 so that it preferably passes from the under side of pulley 54 and over the top of rear roller 36. Note however that there is a cable on each of the pulleys 54. Cable 64 passes along the inside of the channel to a position near roller 42, as can best be seen in FIGURE 5.

At a point in close proximity to forward roller 42 when the platform is in position on the carrier the upper leg of the channel is opened from the edge to the web for a distance slightly greater than the diameter of the platform rollers. There is there defined an opening 66. Close to the rear edge of opening 66 and on the underside of the top portion of channel 20 will be found a small elongated roller 68. On the outside surface of each of the side platform frame members 26 is mounted a small diameter guide pulley 70 on a short shaft 72. The pulleys 70 are axially aligned as are the rollers 68. Likewise, the openings 66 in the upper surfaces of the channels are also aligned. The openings 66 are made by cutting the rear edge of the opening and then cutting forwardly along the web portion. The piece thus cut is bent back as at 74 to act as a guide means for cable 64. In this way it can be seen that cable 64 proceeds from under the crank pulley 54, over the rear roller 36 under the small roller 68 and over the small diameter pulley 70. The cable then proceeds forwardly over the ends of the lapped guide piece 74.

The front end of cable 64 proceeds to the front or drop side of the carrier. At each end of the platform front frame member 30 there is located a generally L-shaped cable anchoring post 80. L-shaped post 80 serves several functions. First, it is a means by which cable 64 is anchored to the front end of the carrier. As can be seen in FIGURE 10, cable 64 extends through a hole in L-shaped guide plate 82 anchored to member 26 and is secured to the short horizontal leg of the L-shaped post 80. Guide plate 82 is connected securely to the side member 26 in such a way as to be flush with the flat outside surface of front platform frame member 30. The cable is then dead-ended in the post 80. Post 80 at the lower end of its vertical or heavy section is integrally formed with rod 86. Rod 86 may be nearly as long as the carrier is wide, from side-to-side of the car. Rod 86 is retained on the inside surfaces of the platform side frame members 26 by slip-type mountings 88. Mountings 88 permit the rod to not only turn but also to slide longitudinally in its mounted position. The upper end of post 80 has an elongated hole 90 therein for receiving the binding strap or rope for holding a load on the platform.

It will be understood from this description that when the platform is rolled to its drop position the forward rollers move ahead in the channels 20 and engage the stops 50. When the rear rollers are directly beneath the openings 66 the back of the platform is swung up around the front rollers but with the cable 64 still engaged over the rear rollers 36. Thus as the cable is uncranked the back end of the platform will swing up until such time as the lowest end thereof is resting against the side of the car. If the load happens to be bearing on the posts 80 the cable will then be played out more with the crank and the load bearing on the posts will slowly push them out sliding the rods 86 on their mountings 88. In this way, posts 80 can be dropped clear to the ground as is shown in dash-dot lines in FIGURE 3 and which is also illustrated in FIGURE 16. It is only necessary to reverse the procedure in order to put the load back in place on the top of the car.

The platform can be locked in place on top of the car by the provision of two elongated holes 94, one each of which is located on the vertical side of the side members 26, so that the rearmost edge of the opening 94 is approximately even with the frontmost portion of roller 36. In this way the spring tensioned V-shaped clip 96 may be sprung into opening 94 to restrain forward movement of the rollers 36. Clips 96 are attached to the underside of channels 20 by virtue of chains or cords or some similar means 98.

The platform itself has holes for sockets 100 strategically located therein to accommodate rail or fencing structure on the platform as shown in FIGURE 17, or a rack structure such as is shown in FIGURE 18. Also the platform is provided at each of the four corners thereof with cable strapping means 102.

The platform can be a plain, smooth surface if desired. But a preferred form includes a turntable 104. Turntable 104, centered with respect to the carrier, is mounted by extending strong rigid frame member 106 from the rear to the front or drop side of the carrier platform frame between the angle frame members 28 and 30. A heavy supporting shaft journal 108 is mounted on member 106 and rigidly secured to the center of the turntable 104. Actually a round opening will have to be cut in the surface of the platform in order to accommodate the turntable. The turntable will be of slightly greater thickness than the platform surface since it is in effect a cantilevered structure and will require the extra thickness for strength factors. If the object to be carried is, for example, a small boat, the turntable structure might also have thereon holding means generally designated by the number 110 near that side of the carrier which is closest to the front of the vehicle. Straps 112 may then be passed over the load and firmly secured to the means provided on the corners and edges of the carrier. Note that the turntable structure permits the user to unload the boat very conveniently. In this regard, see the series of illustrations in FIGURES 14, 15 and 16. Hence, the boat could be lowered end first or side first depending upon the wishes of the user. If the carrier is provided with the turntable 104 there is still no reason why it cannot be used with rail or fence structure 114 or rack type structures 116.

The foregoing is considered as illustrative only of the principles of this invention. Numerous modifications and changes will readily occur to those skilled in the art and hence it is not desired to limit the invention to the exact construction shown and described.

What is claimed is:
1. A car top carrier having a side drop loading platform, comprising:
 (a) a rigid supporting frame structure adapted to be mounted on said car and including opposed generally parallel spaced apart track members,
 (b) a platform means having a frame means and top surface, said frame means having rear rollers at the back side ends thereof engaging said track member and also having front rollers near the middle sides thereof engaging said track members,
 (c) an opening in each of the track members near the middle thereof, and
 (d) reel and cable means in each of said track members, said cable extending over said rollers, out of said opening and anchored to the front corner of said platform.

2. The structure according to claim 1, in which said platform includes a generally round rotatable turntable means mounted on said platform frame means.

3. A car top carrier having a side drop loading platform, comprising:
 (a) a rigid supporting frame structure adapted to be mounted on said car and including opposed generally parallel channel shaped side track members,
 (b) a platform having a frame means and top surface, said frame means having axially aligned rear rollers near the back corners and axially aligned front rollers near the middle on opposed sides thereof, said rollers being engaged with said side track members,
 (c) an opening in the upper surface of each of said side track members approximately in the middle thereof,
 (d) a cable reel means located in each of said track means between the extreme rear ends thereof and said rear rollers, said reel means having a cable means thereon passing over said rear roller forwardly and over said front rollers, out of said opening and thence forwardly to be anchored to the front corners of said platform.

4. The structure according to claim 3 in which said platform includes a generally round rotatable turntable means mounted on said platform frame means.

5. A car top carrier having a side drop platform comprising:
 (a) a rigid supporting frame structure adapted to be mounted on said car and including spaced-apart generally parallel, channel-shaped side track members, said tracks having a rear end generally over one side of said car and a front end generally over the other side of said car and said tracks being closed at each end thereof,
 (b) a platform having a frame means and top surface means, said frame means having axially aligned rear rollers secured to its sides near the rear corners and axially aligned front rollers secured to its sides near the middle thereof, said rollers engaging said side track members,
 (c) an opening in the upper leg of each of said side track members approximately in the middle thereof,
 (d) a guide pulley on each side of said platform located above said opening, and
 (e) a stationary, rotatable cable reel means located in each of said track means between the extreme rear ends thereof and said rear rollers, said reel means being mounted on a common shaft means having a crank handle means thereon, each of said reel means having a cable means thereon passing over said rear roller forwardly over said front roller, up and out of said opening over said guide pulley and thence forwardly to be anchored to the front corner of said platform.

6. The structure according to claim 5 in which said platform includes a generally round rotatable turntable means mounted on said platform frame means.

References Cited by the Examiner

UNITED STATES PATENTS

| 2,091,069 | 8/37 | Girl | 214—454 |
| 2,667,295 | 1/54 | Johnston et al. | 214—450 |
| 3,141,565 | 7/64 | Cain | 214—450 |

FOREIGN PATENTS 684,190  3/30  France.

HUGO O. SCHULZ, *Primary Examiner.*